(12) United States Patent
Yang

(10) Patent No.: US 8,582,220 B2
(45) Date of Patent: Nov. 12, 2013

(54) LENS MODULE

(75) Inventor: Chuan-Hui Yang, Tainan (TW)

(73) Assignee: Himax Technologies Limited, Tainan (TW)

( * ) Notice: Subject to any disclaimer, the term of this patent is extended or adjusted under 35 U.S.C. 154(b) by 114 days.

(21) Appl. No.: 13/310,862

(22) Filed: Dec. 5, 2011

(65) Prior Publication Data

US 2013/0141802 A1     Jun. 6, 2013

(51) Int. Cl.
*G02B 3/02*     (2006.01)
(52) U.S. Cl.
USPC .......................................... 359/793; 359/717
(58) Field of Classification Search
CPC ...... G02B 3/02; G02B 13/002; G02B 13/003; G02B 13/006
USPC .................. 359/708–717, 733–736, 754–793
See application file for complete search history.

(56) References Cited

U.S. PATENT DOCUMENTS

| | | | |
|---|---|---|---|
| 7,474,480 B2* | 1/2009 | Oh et al. | 359/794 |
| 2010/0053770 A1* | 3/2010 | Sato et al. | 359/717 |
| 2010/0246030 A1* | 9/2010 | Chang et al. | 359/717 |

* cited by examiner

*Primary Examiner* — Darryl J Collins
(74) *Attorney, Agent, or Firm* — McClure, Qualey & Rodack, LLP

(57) ABSTRACT

A lens module includes a first lens group and a second lens group. The first lens group includes a first substrate, a diaphragm, a first lens, and second lens. The diaphragm with a aperture is disposed on the first side of the first substrate. The first lens and the second lens are respectively disposed on the first side and the second side of the first substrate. The second lens group includes a second substrate, a third lens, and a fourth lens. The third lens and the fourth lens are respectively disposed on the first side and the second side of the second substrate. The lens module meets the following requirements: $1.5<F1/Ft<2$; and $1.5<F2/Ft<2$, in which Ft represents a effective total focal length of the lens module, F1 represents an effective focal length of the first lens group, and F2 represents an effective focal length of the second lens group.

10 Claims, 6 Drawing Sheets

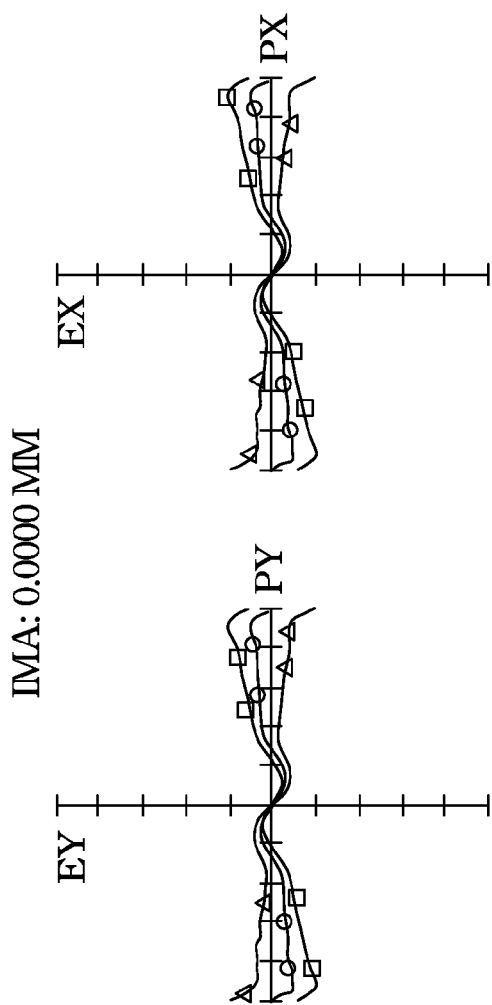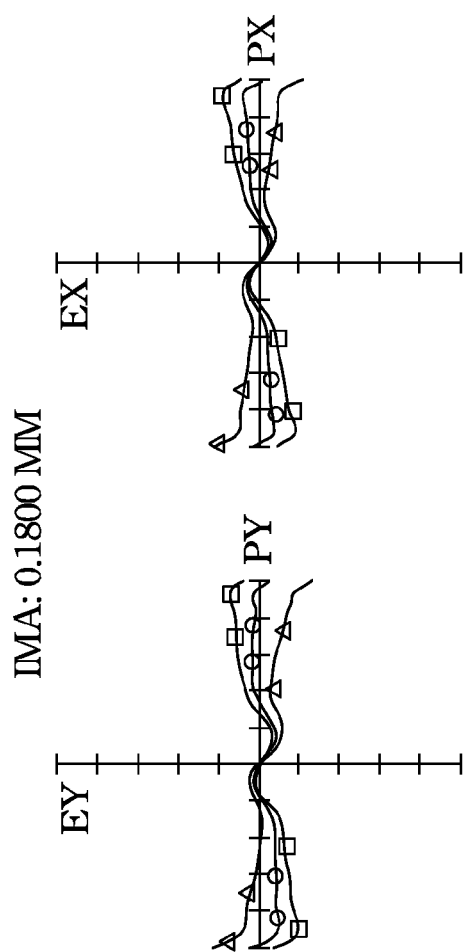

LENS MODULE

BACKGROUND

1. Field of Invention

This invention relates to a lens system, and more particularly relates to a wafer-level lens module.

2. Description of Related Art

Miniaturized cameras are widely used in many electronic products, such as mobile phones or personal computers. Mobile phones or personal computers employing imaging devices have become popular due to employment of solid-state image capture elements such as CCD (a charged coupled device) type image sensors, CMOS (a complementary metal oxide semiconductor) type image sensors and the like, allowing for higher performance and miniaturization of imaging devices. Additionally, there is demand for further miniaturization of image capture lenses loaded on the imaging devices.

However, the conventional image capture lenses are three dimensional (3-D) structures, and it is difficult to control accuracy of lateral shift and tilt for each lens surface during fabrication if the image capture needs to be further miniaturized. As a result, the tolerance of the image capture becomes worse.

SUMMARY

According to one embodiment of the present invention, a lens module for capturing images is disclosed. The lens module includes a first lens group and a second lens group. The first lens group includes a first substrate, a diaphragm, a first lens, and a second lens. The first substrate has a first side and a second side. The diaphragm is disposed on the first side of the first substrate, in which an aperture through which the image is captured is located on the diaphragm. The first lens is disposed on the first side of the first substrate while the second lens disposed corresponding to the second side of the first substrate.

The second lens group includes a second substrate, a third lens, and a fourth lens. The second substrate has a first side and a second side. The third lens is disposed on the first side of the second substrate while the fourth lens is disposed on the second side of the second substrate. The lens module meets the following requirements: 1.5<F1/Ft<2; and 1.5<F2/Ft<2, in which Ft represents a effective total focal length of the lens module, F1 represents an effective focal length of the first lens group, and F2 represents an effective focal length of the second lens group.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIG. 4A~FIG. 4F show the transverse ray fan plot according to one embodiment of the present invention.

DETAILED DESCRIPTION

Figure 1:
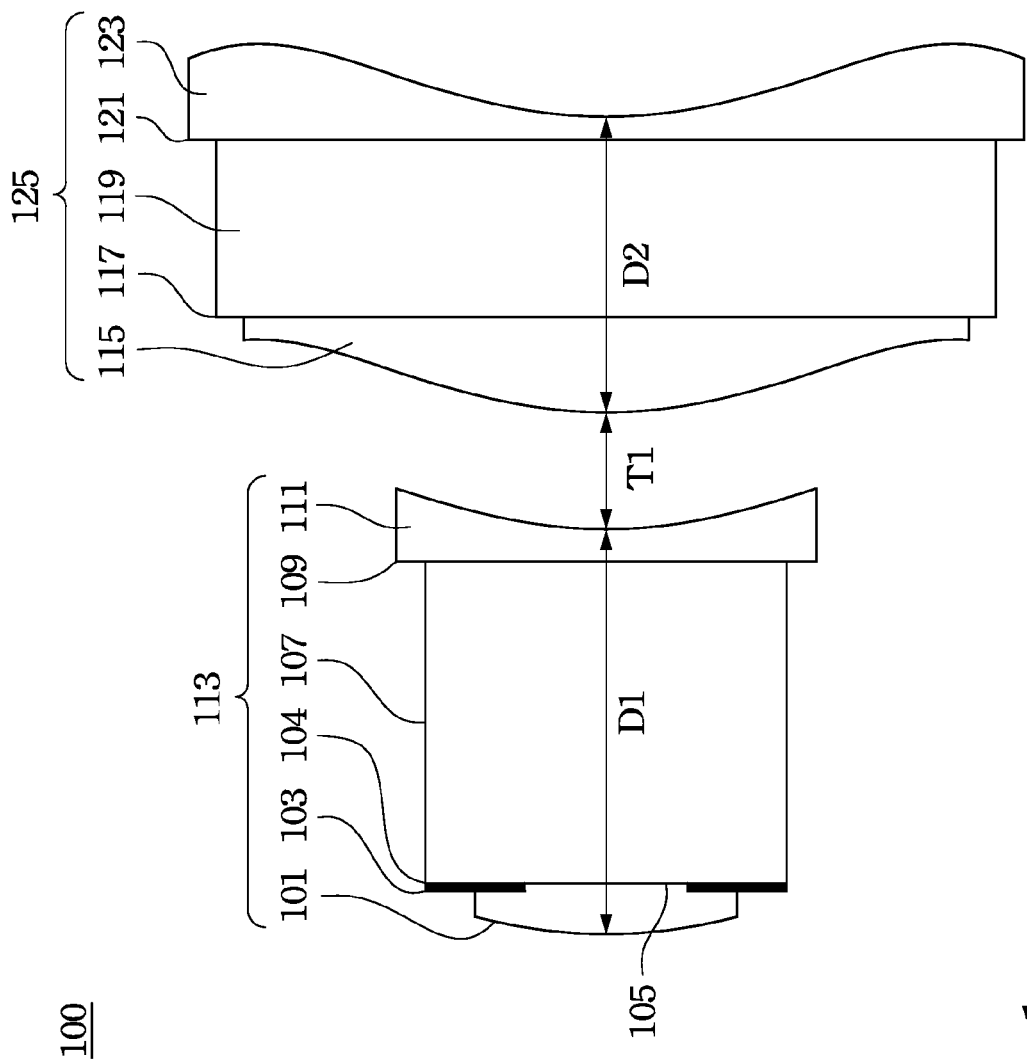
FIG. 1 shows a structure diagram of the lens module according to one embodiment of the present invention.

Reference will now be made in detail to the present embodiments of the invention, examples of which are illustrated in the accompanying drawings. Wherever possible, the same reference numbers are used in the drawings and the description to refer to the same or like parts.

The lens module of the following embodiments can miniaturize the lens module and simplify the structure as well as the manufacturing process of the lens module; in addition, the tolerance and the image quality corresponding to the lens module are also improved.

FIG. 1 shows a structure diagram of the lens module according to one embodiment of the present invention. The lens module 100 includes a first lens group 113 and a second lens group 125.

The first lens group 113 includes a first substrate 107, a diaphragm 103, a first lens 101, and a second lens 111. The first substrate 107 has a first side 103 and a second side 109. The diaphragm 103 is disposed on the first side 103 of the first substrate 107, in which an aperture 105 through which the image is captured is located on the diaphragm 103. The first lens 101 is disposed on the first side 104 of the first substrate 107 while the second lens 111 is disposed corresponding to the second side 121 of the second substrate 119.

The second lens group 125 includes a second substrate 119, a third lens 115, and a fourth lens 123. The second substrate 119 has a first side 117 and a second side 121. The third lens 115 is disposed on the first side 117 of the second substrate 119 while the fourth lens 123 is disposed on the second side 121 of the second substrate 119.

The lens module 100 meets the following requirements: 1.5<F1/Ft<2; and 1.5<F2/Ft<2, in which Ft represents a effective total focal length of the lens module 100, F1 represents an effective focal length of the first lens group, and F2 represents an effective focal length of the second lens group.

The first lens 101, the second lens 111, the third lens 115 and the fourth lens 123 are made of aspherical glass or plastic while the first substrate 107 and the second substrate 119 are made of glass. In addition, the first lens 101 can be positive lenses while the second lens 111 can be negative lenses. In some cases, the first lens group 113 behaves like a meniscus lens while the second lens group 125 behaves as a field corrector which corrects chief ray angle to match an image sensor (Not shown).

Figure 2:
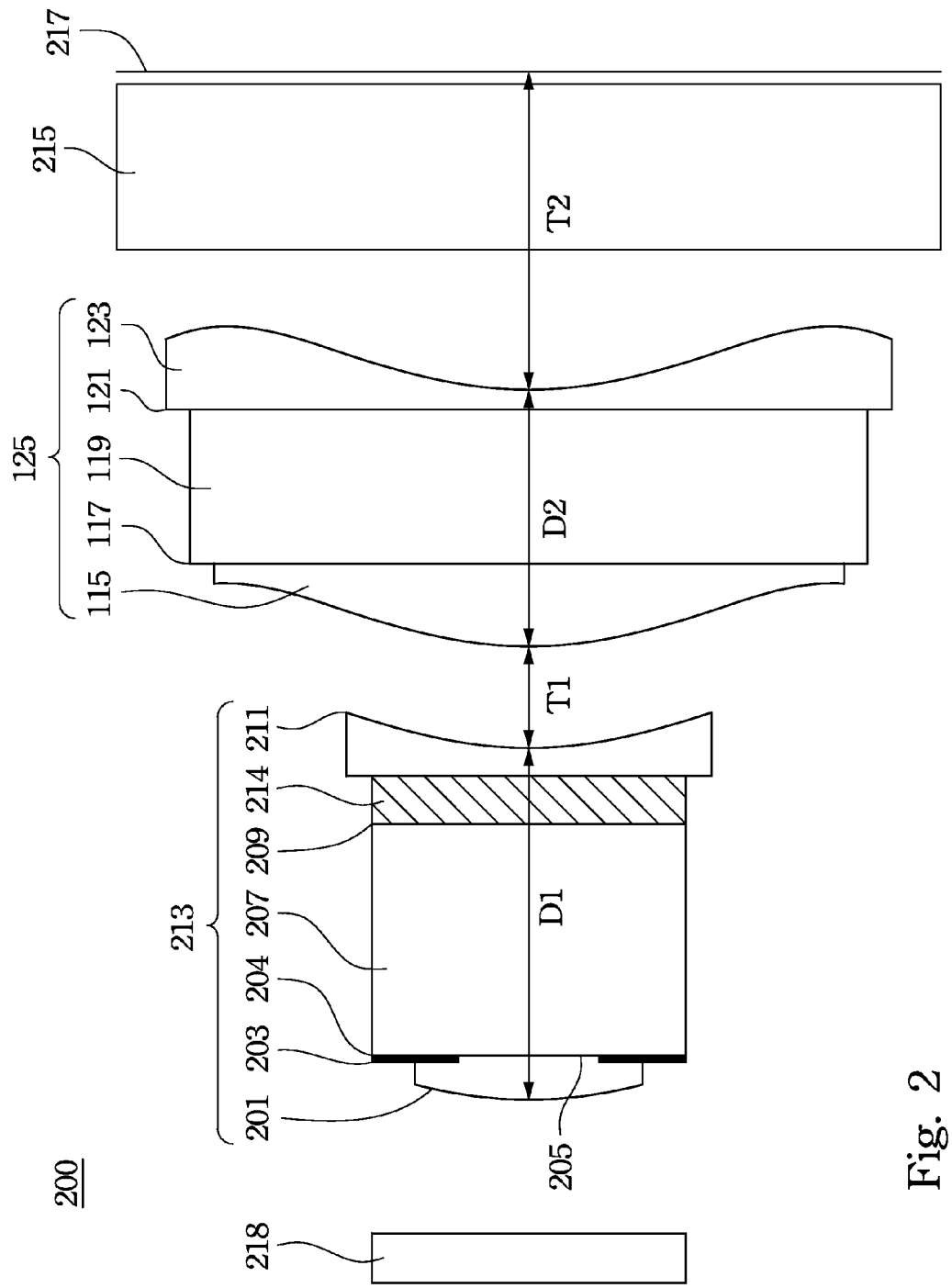
FIG. 2 shows a structure diagram of the lens module according to another embodiment of the present invention.

FIG. 2 shows a structure diagram of the lens module according to another embodiment of the present invention. The lens module 200 has an effective total focal length, and the lens module 200 includes a first lens group 213 and a second lens group 125. In this embodiment, the second lens group 125 is same to the second lens group 125 shown in FIG. 1 while the structure of the first lens group 213 is somewhat different from the structure of the first lens group 113 shown in FIG. 1.

The first lens group includes a first substrate, a diaphragm, a first lens, a second lens, and a IR cut filter, particularly. The first substrate 207 has a first side 204 and a second side 209. The diaphragm 203 is disposed on the first side 204 of the first substrate 207, in which an aperture 205 through which the image is captured is located on the diaphragm 203. The first lens is disposed on the first side 204 of the first substrate 207, and the second lens 211 is disposed corresponding to the second side 209 of the first substrate 207. Moreover, the IR cut filter 214 is formed between the first substrate 207 and the second lens 211.

Still, the lens module 200 meets the requirements: $1.5<F1/Ft<2$ and $1.5<F2/Ft<2$, in which Ft represents a effective total focal length of the lens module, F1 represents an effective focal length of the first lens group, and F2 represents an effective focal length of the second lens group.

The second lens group 125 is disposed in a first distance T1 from the first lens group 213. Furthermore, the first lens group 213 is d1 thick, the second lens group 125 is d2 thick, and thicknesses of the first lens group 213 and the second lens group 125 meet the following $1.8<d1/d2<2.2$.

The lens module 200 further includes a back cover glass 215 and an image plane 217. The front cover glass 218 is over the first lens group. The back cover glass 215 is disposed adjacent to the second lens group 125, in which the second lens group 125 is disposed between the first lens group 213 and the back cover glass 215.

The image plane 217 is disposed corresponding to and in a second distance T2 from the second lens group. The first distance T1 and the second distance T2 follow the requirement: $0.25<T1/T2<0.35$.

The first lens 201, the second lens 211, the third lens 115 and the fourth lens 123 are made of aspherical glass or plastic while the first substrate 207 and the second substrate 119 are made of glass. The first lens 201 and the third lens 115 can be positive lenses while the second lens 211 and the fourth lens 123 can be negative lenses. In more retail, the first lens group 213 behaves like a meniscus lens while the second lens group 125 behaves as a field corrector which corrects chief ray angle to match an image sensor.

In this embodiment, the elements of the lens module 200 still has the characteristics stated in Table I, Table II, and Table III.

TABLE I

| Element | Thickness (mm) | Diameter (mm) |
| --- | --- | --- |
| First lens | 0.105 | 0.61 |
| First substrate | 0.7 | 0.48 |
| Second lens | 0.045 | 0.82 |
| First distance | 0.173 | 0.86 |
| Third lens | 0.121 | 1.1 |
| Second substrate | 0.35 | 1.17 |
| Fourth lens | 0.058 | 1.37 |
| Second distance | 0.2 | 1.47 |
| Back cover glass | 0.38 | 1.57 |
| Image plane | 0.025 | 1.77 |

TABLE II

| Surface | Type | Radius | material | | Conic |
| --- | --- | --- | --- | --- | --- |
| OBJ | STANDARD | Infinity | nd | vd | 0 |
| 1 | EVENASPH | 0.91 | 1.57 | 31.6 | −75 |
| 2(STO) | STANDARD | Infinity | 1.51 | 61.6 | 0 |
| 3 | STANDARD | Infinity | 1.57 | 31.6 | 0 |
| 4 | EVENASPH | 1.47 | air | | −2.8 |
| 5 | EVENASPH | 0.79 | 1.57 | 31.6 | −1.1 |
| 6 | STANDARD | Infinity | 1.51 | 61.6 | 0 |
| 7 | STANDARD | Infinity | 1.57 | 31.6 | |
| 8 | EVENASPH | 1.47 | air | | 0 |
| 9 | STANDARD | Infinity | 1.52 | 64.9 | 0 |
| 10 | STANDARD | Infinity | | | 0 |
| IMA | STANDARD | Infinity | | | 0 |

In table II, the surface column records the number of the surface, and the aspheric surface is defined by the following equation, in which the symbol Z represents the optical axial directional Z-axis, c represents the vertex curvature, K represents the conic constant, and αi represents the aspherical coefficients:

$$Z = \frac{cr^2}{1 + \sqrt{1 - (1+k)c^2 r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16},$$

$\alpha_1 = 0$ for all surfaces.

TABLE III

SURFACE DATA DETAIL:

Surface 1 EVENASPH

| | |
| --- | --- |
| Coeff on r 4 | 9.6 |
| Coeff on r 6 | −234 |
| Coeff on r 8 | 4850 |
| Coeff on r 10 | −73000 |
| Coeff on r 12 | 710000 |
| Coeff on r 14 | −3800000 |
| Coeff on r 16 | 8300000 |

Surface 4 EVENASPH

| | |
| --- | --- |
| Coeff on r 4 | −0.92 |
| Coeff on r 6 | −4.1 |
| Coeff on r 8 | 136 |
| Coeff on r 10 | −1035 |
| Coeff on r 12 | 3710 |
| Coeff on r 14 | −6000 |
| Coeff on r 16 | 2600 |

Surface 5 EVENASPH

| | |
| --- | --- |
| Coeff on r 4 | −1.43 |
| Coeff on r 6 | 2.8 |
| Coeff on r 8 | −5.7 |
| Coeff on r 10 | −4.9 |
| Coeff on r 12 | 26.7 |
| Coeff on r 14 | 72 |
| Coeff on r 16 | −300 |

Surface 8 EVENASPH

| | |
| --- | --- |
| Coeff on r 4 | −0.09 |
| Coeff on r 6 | −0.96 |
| Coeff on r 8 | 0.35 |
| Coeff on r 10 | 1.67 |
| Coeff on r 12 | −2 |
| Coeff on r 14 | −1.66 |
| Coeff on r 16 | 2.1 |

Figure 3:
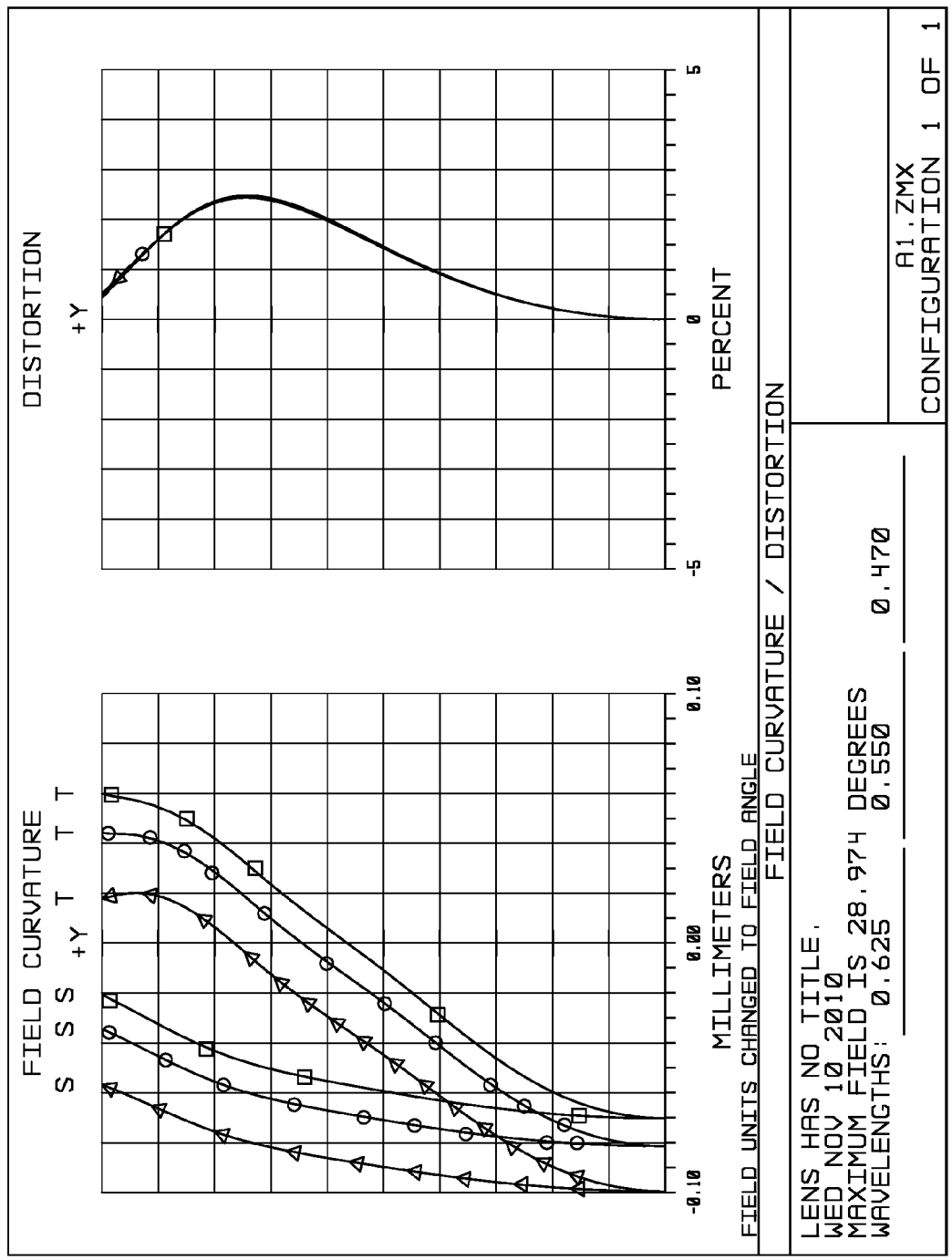
FIG. 3 shows the performance diagram of the lens module according to one embodiment of the present invention.
Figure 4C:
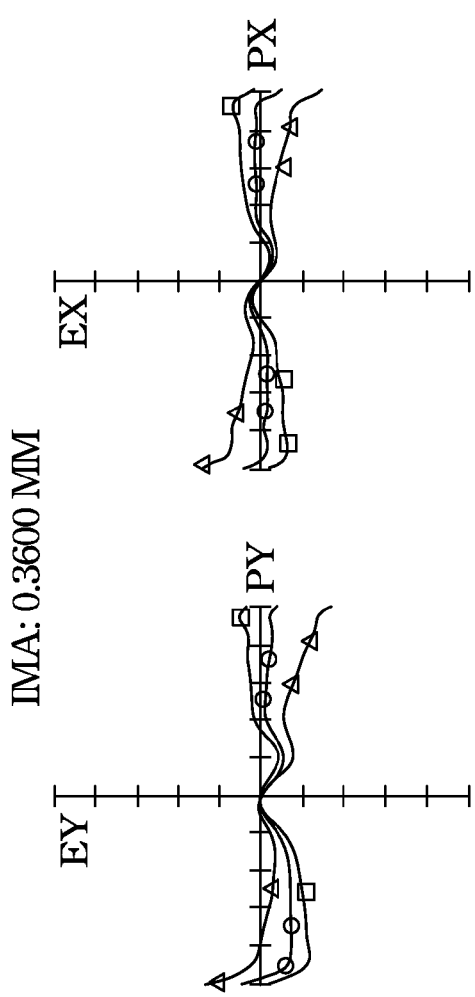
Figure 4D:
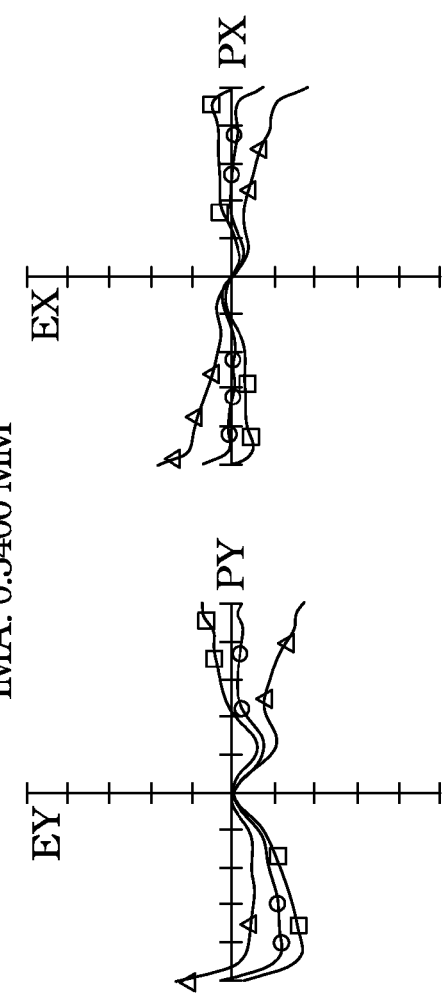
Figure 4E:
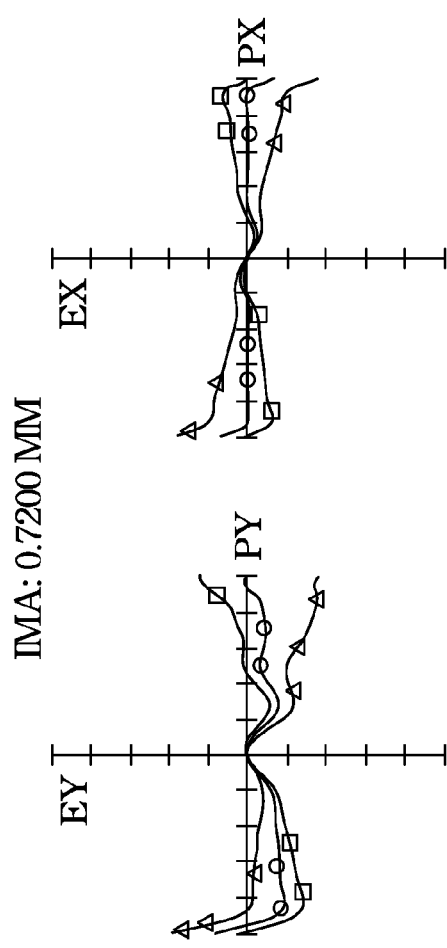
Figure 4F:
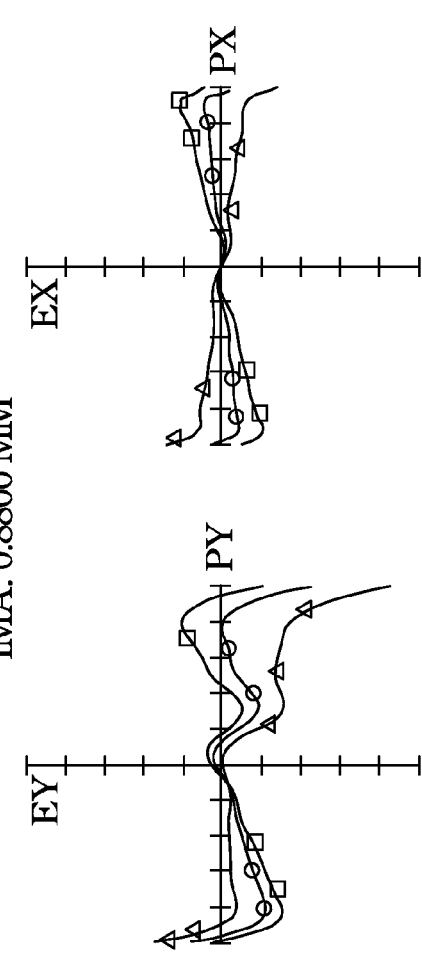

FIG. 3 shows the performance diagram of the lens module according to one embodiment of the present invention. In the right part of FIG. 3, the distortions of the waves having different wavelengths are almost the same.

FIG. 4A~FIG. 4F show the transverse ray fan plot and aberration according to one embodiment of the present invention. In these figures, the maximum scales are around ±20.000 um.

The lens module of the above embodiments can miniaturize the lens module and simplify the structure as well as the manufacturing process of the lens module; in addition, the tolerance and the image quality corresponding to the lens module are also improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A lens module for capturing images, wherein the lens module has an effective total focal length, and the lens module comprises:
    a first lens group comprising:
    a first substrate having a first side and a second side;
    a diaphragm disposed on the first side of the first substrate, wherein an aperture through which the image is captured is located on the diaphragm;
    a first lens disposed on the first side of the first substrate; and
    a second lens disposed corresponding the second side of the first substrate;
    a second lens group comprising:
    a second substrate having a first side and a second side;
    a third lens disposed on the first side of the second substrate; and
    a fourth lens disposed on the second side of the second substrate, wherein the lens module meets the following requirements:

$1.5<F1/Ft<2$; and $1.5<F2/Ft<2$, wherein Ft represents a effective total focal length of the lens module, F1 represents an effective focal length of the first lens group, F2 represents an effective focal length of the second lens group, the first lens croup is d1 thick, the second lens group is d2 thick, and thicknesses of the first lens group and the second lens group meet the following requirement:

$1.8<d1/d2<2.2$.

2. The lens module as claimed in claim 1, further comprising a IR cut filter formed between the first substrate and the second lens.

3. The lens module as claimed in claim 1, wherein the second lens group is disposed in a first distance T1 from the first lens group.

4. The lens module as claimed in claim 3, further comprising:
    a back cover glass disposed adjacent to the second lens group, wherein the second lens group is disposed between the first lens group and the back cover glass; and
    an image plane disposed corresponding to and in a second distance T2 from the second lens group.

5. The lens module as claimed in claim 4, wherein the first distance T1 and the second distance T2 follow the following requirement:

$0.25<T1/T2<0.35$.

6. The lens module as claimed in claim 1, wherein the first lens, the second lens, the third lens and the fourth lens are made of aspherical glass or plastic.

7. The lens module as claimed in claim 1, wherein the first substrate and the second substrate are made of glass.

8. The lens module as claimed in claim 1, wherein the first lens group behaves like a meniscus lens.

9. The lens module as claimed in claim 1, wherein the second lens group behaves as a field corrector which corrects chief ray angle to match an image sensor.

10. The lens module as claimed in claim 1, further comprising a front cover glass over the first lens group.

* * * * *